United States Patent [19]

Atalar et al.

[11] Patent Number: 4,779,241

[45] Date of Patent: Oct. 18, 1988

[54] ACOUSTIC LENS ARRANGEMENT

[75] Inventors: Abdullah Atalar; Hayrettin Koeymen, both of Ankara, Turkey

[73] Assignee: Ernst Leitz Wetzlar GmbH, Wetzlar, Fed. Rep. of Germany

[21] Appl. No.: 877,752

[22] Filed: Jun. 24, 1986

[30] Foreign Application Priority Data

Jun. 24, 1985 [DE] Fed. Rep. of Germany ....... 3522491

[51] Int. Cl.[4] ................................................ G01S 9/68

[52] U.S. Cl. .................................... 367/104; 367/151; 181/176

[58] Field of Search ................. 367/151, 103, 104, 99; 181/175, 176, 191, 400; 73/627, 642, 644

[56] References Cited

U.S. PATENT DOCUMENTS

| | | | |
|---|---|---|---|
| 2,611,445 | 9/1952 | Meeker et al. | 367/87 |
| 3,028,752 | 4/1962 | Bacon | 367/151 |
| 3,159,023 | 12/1964 | Steinbrecher | 367/151 |
| 3,389,372 | 6/1968 | Halliday et al. | 367/151 |
| 4,028,933 | 6/1977 | Lemons et al. | 73/67.6 |
| 4,332,016 | 5/1982 | Berntsen | 367/103 |

FOREIGN PATENT DOCUMENTS 3409929 9/1985 Fed. Rep. of Germany .

OTHER PUBLICATIONS

Appl. Phys. Lett. 42(5), Mar. 1, 83, "Confocal Surface Acoustic Wave Microscopy", R. Smith and H. K. Wickramasinghe, pp. 411–413.

J. Appl. Phys. 55 (1), Jan. 1, 84, "A New Focusing Method for Nondestructive Evaluation by Surface Acoustic Wave", B. Nongaillard, M. Ourak, J. M. Rouvaen, M. Houze, and E. Bridoux, pp. 75–79.

*Primary Examiner*—Thomas H. Tarcza
*Assistant Examiner*—Daniel T. Pihulic
*Attorney, Agent, or Firm*—Foley & Lardner Schwartz, Jeffery Schwaab, Mack Blumenthal & Evans

[57] ABSTRACT

An acoustic lens arrangement having at least one transducer for the generation and/or for the reception of a plane acoustic wavefield. The arrangement includes a focusing surface for focusing the acoustic wavefield in an object region and at least one medium for the low-loss transmission of the acoustic wavefield between a transducer, the focusing surface and the object region to be investigated. The longitudinal axis of the focusing surface is inclined relative to the direction of the normal to the acoustic wavefield in such a manner that when the longitudinal axis is positioned normal to the surface of the object region, the acoustic beams incident thereon form a critical angle $\theta_R$ with the normal to the surface of the object.

21 Claims, 5 Drawing Sheets

ACOUSTIC LENS ARRANGEMENT

BACKGROUND OF THE INVENTION

The invention relates to acoustic lens.

A known lens arrangement is shown, for example, in U.S. Pat. No. 4,028,933. A piezoelectric transducer is disposed on one side of a cylindrical sapphire rod, and a spherical concave surface is incorporated in the opposite side. A high-frequency electric field applied to the transducer generates in the sapphire rod a plane acoustic wavefield, which is focused by the spherical concave surface into an adjoining immersion liquid.

The lens arrangement is part of an acoustic microscope. In this connection, an object to be investigated is placed at the acoustic focus. After interaction of the focused acoustic waves with the object (generation of longitudinal waves, bulk waves), acoustic waves proceed from the object, which are caught by the same or another acoustic lens and converted into electrical signals in the piezoelectric transducer. By scanning of the object in the manner of a raster, an image of the object representing the acoustic interaction can be obtained from these electrical signals.

The acoustic waves regularly reflected at the object or those which are transmitted are essentially utilized for acoustic microscopy. However, it is known that acoustic waves which impinge on an object surface at a specific angle dependent on the material (Rayleigh angle $\theta_R$) excite surface waves in this surface (surface acoustic waves, SAW). Along their path of propagation, the SAW leak in the form of bulk acoustic waves out of the object (leaky SAW). These waves can also be detected and converted into electrical signals. In acoustic microscopy, they are superposed on the regular signal, in particular in the case of focusing on an object region situated below the object surface. By means of particular circuitry, they can also be analyzed separately (cf. West German Patent Application No. P 3,409,929.8).

If the SAW impinge on inhomogeneities in the object surface, the SAW are reflected thereat, so that they change their direction of propagation. The result of this is that leaky waves also appear to an increased extent in this direction. Since the SAW penetrate relatively deep into the object surface, they are now increasingly utilized for the purpose of determining properties of the material of various objects. The particular advantage is that the method which is involved is a non-destructive measurement method, with which quantitative measurements are also possible. For this purpose, it is however necessary to increase the local resolving power and to improve the signal gain.

With regard to the improvement of the SAW measurement method, two problems must essentially be solved. The first problem consists in the generation, in a manner as efficient as possible, of the SAW in the surface of the material to be investigated, which as a rule is not piezoelectric. The second problem consists in focusing the generated SAW on the smallest possible spot size.

Specifically for the generation of SAW on non-piezoelectric surfaces, several different arrangements have already been proposed, which however are not suitable for focusing the SAW.

In Appl. Phys. Lett. 42, pages 411–413 (1983), a process for the generation of convergent SAW on the surface to be investigated is described, which makes use of an acoustic lens of the type mentioned in the introduction, with which however the acoustic transducer is constructed as a semicircular surface. In the defocused condition, this lens generates SAW which are focused at a point on the optical axis of the acoustic lens. More accurate investigations have, in this connection, shown that the acoustic energy converted into SAW originates only from a very narrow annular region of the irradiation surface of the acoustic lens, in respect of which region the already mentioned Rayleigh angle is maintained with regard to the inclination of the radiation. The remaining energy of the irradiated acoustic wavefield is specularly reflected at the surface of the object.

Another process by which this disadvantage is intended to be avoided is described in J. Appl. Phys. 55 (January 1984), pages 75–79. An acoustic lens having a cylindrical exit surface is inclined by its longitudinal axis relative to the surface of the object in such a manner that the axis of radiation maintains the Rayleigh angle. By this means, an improved conversion ratio of the irradiated ultrasonic wavefield into SAW is indeed achieved, but, in this case also, not all irradiated waves are in fact inclined at the Rayleigh angle, and instead of a point focus there is a line focus, over which the SAW energy is distributed.

SUMMARY OF THE INVENTION

An object of the invention is to provide an acoustic lens arrangement which, makes possible point focusing of the SAW with the highest possible degree of conversion of the irradiated acoustic wavefield into SAW, and which can be produced in a simple manner with a high signal gain.

The angle of inclination $\theta_R$ of the acoustic beams at incidence on the object region depends upon the ratio of the phase velocities of the acoustic waves in the mutually adjoining media. In the case of an immersion liquid following the configuration of the cylindrical surface, $V_I$ is the velocity of propagation in this medium. Where a solid transmission medium is involved, $V_I$ can be the velocity of propagation of the longitudinal waves or of the shear waves in the solid body; however, it can also be the velocity of propagation in a gaseous medium.

The velocity of propagation of sound in the object region is dependent on various properties of the material, such as for example the lattice structure, the density, the elasticity or a layer structure. A distinction is drawn between differing velocities of propagation $V_R$ for

| | |
|---|---|
| Rayleigh waves | (surface waves) |
| Pseudo-surface waves | (in the case of anisotropic solid bodies) |
| Love waves | (in the case of objects which are layered parallel to the surface) |
| Stonely waves | (in the case of objects which are layered parallel to the surface) |
| Sezewa waves | (in the case of objects which are layered parallel to the surface). |

BRIEF DESCRIPTION OF THE DRAWINGS

Exemplary embodiments of the acoustic lens arrangement according to the invention are schematically represented in the drawings. These are described in greater detail below, in which connection, reference will also be made to particular advantages as compared with the known arrangements. In the individual drawings.

DETAILED DESCRIPTION OF THE PREFERRED EMBODIMENTS

Figure 1:
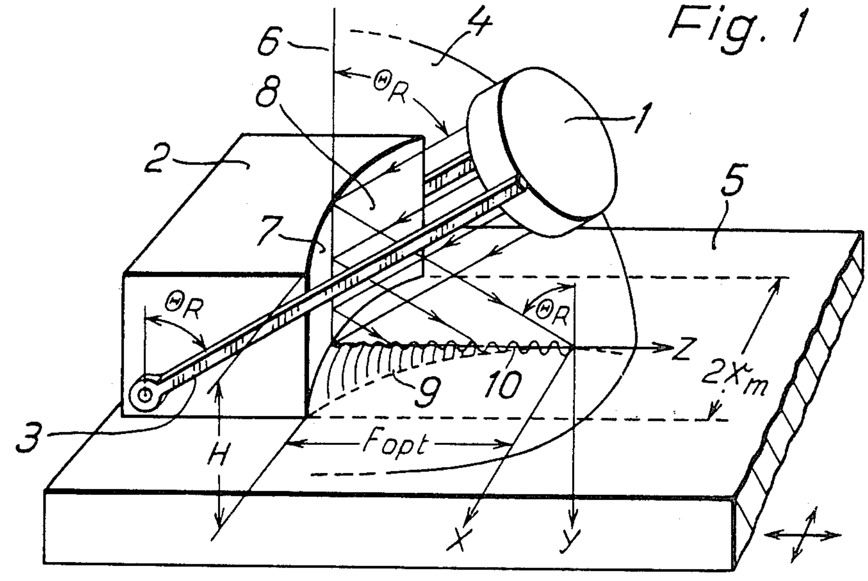
FIG. 1 shows a representation of the principle of the mode of action of the acoustic lens arrangement.

Starting from FIG. 1, the basic mode of operation of the lens arrangement according to the invention is to be explained in the first instance. An acoustic beam, which is generated by a planar transducer in an immersion liquid, falls at an inclination on a parabolically concave cylindrical surface of a solid body. If the angle of incidence is large enough, the entire acoustic power is specularly reflected and no bulk waves are excited in the solid body. The reflector acts in the manner of a parabolic cylindrical mirror.

The incident acoustic beam is to be represented by a plane wave of the form exp $[j(k_y.y+k_z.z]$. On reflection, the y- and z-dependence does not change except a sign change in z direction, but an x-dependent term arises, which takes into account the reflection on the parabolic cylindrical surface.

Since a parabolic cylindrical surface focuses a vertically incident plane wave in a line, an obliquely incident plane wave is focused in a line with linearly variable phase. The wavefronts are conical, and in the present case the axis of the cone coincides with the line of focus of the parabolic cylinder.

If an object is disposed with a plane surface perpendicular to this axis, then the line of intersection of the conical wavefronts with the surface of the object is always circular. In contrast to this, with the arrangement known from J. Appl. Phys. 55, pages 75–79, cylindrical wavefronts are generated, the line of intersection of which with the surface of the object is elliptical. Because of the geometrical limitation of the reflector according to the invention, the wavefronts reflected at it encompass only a section of a cone, so that, instead of a circle, the line of intersection represents a circular arc.

As has already been mentioned, an ultrasonic beam generates, on passing through a liquid/solid interface, SAW in the surface of the solid body, with an intensity which increases as the angle of incidence becomes closer to the Rayleigh angle. According to the invention, this fact is combined with the particular properties of the described reflector, in that the angle of incidence of the beam generated by the acoustic transducer on the reflector is selected to be equal to the Rayleigh angle. The wavefront passing to the interface with the object then intersects the surface of the object in circular arcs with decreasing radius. Each generated surface wave will intensify the surface wave generated in front of it with a greater radius in a phase-locked manner, since the selected specific angle of incidence of the acoustic wavefront coincides with the k vector component of the surface wave along the transition interface. It should be emphasized that in this manner the entire energy contained in the conical wavefront is converted into a single, circularly convergent wavefront of the SAW. Almost the entire acoustic energy generated by the transducer is concentrated at a focal point which is limited only by diffraction.

In contrast to this, in the case of the cylindrical wavefront which is obliquely incident and which is known from the prior art, the lines of intersection with the surface of the object are elliptical arcs with uniform shape, which do not provide any in phase reinforcement of the already generated wavefronts of the SAW. Even a convergent, spherically shaped wavefront cannot provide this, because only a fraction of the incident wavefront fulfills the condition of the Rayleigh angle.

The generated SAW have only a limited life, and are finally leak as longitudinal waves into the liquid layer. These waves, which are also referred to as leaky waves, can arise at the very time at which the surface waves are generated. If the surface of the object is perfectly plane and does not exhibit any defects, i.e., if no surface wave reflectors are present, almost no leaky waves will return to the transducer. Since the incident beam is limited in its diameter, and plane waves are also included in its angular spectrum, SAW which travel to the reflector, i.e., which progress is a rearward direction, can be excited. The leaky waves originated from these SAW will then generate an output signal at the acoustic transducer, even if no defects are present at the surface. However, this effect is very slight, and can be further suppressed by corresponding beam expansion and appropriate shaping of the reflector. In these circumstances, the acoustic transducer only receives an adequately strong signal if the direction of propagation of the forward traveling SAW is altered at any particular defect. In the event that such a defect exists precisely at the focal point, the SAW are reflected thereat and will return as a circularly divergent wave. The waves which are backscattered therefrom into the liquid combine again in the original conical wavefront and are directed back by the reflector in the form of a collimated beam to the acoustic transducer. If the defect is not located precisely at the focal point, the wavefront reflected thereat will not be able to reproduce precisely the originally irradiated beam either, so that the output signal of the transducer is smaller than in the case of the in-focus setting.

An exemplary embodiment is schematically represented in FIG. 1. The acoustic lens arrangement consists of an acoustic transducer 1, a cylindrical mirror 2 and a mechanical connection 3, by means of which the angle of inclination and the position of the transducer 1 relative to the mirror 2 can be set in such a manner that the transducer acoustically irradiates the entire mirror surface, independent of the angle of inclination. During operation, the arrangement is immersed in a water bath 4 serving as immersion medium. The mirror 2 is disposed on the object 5 to be investigated, in such a manner that the longitudinal axis 6 of its cylindrical concave surface 7 stands perpendicular to the surface of the object. The pulsed acoustic wavefield 8 generated by the transducer 1 is incident on the mirror 2 at the Rayleigh angle $\theta_R$. From the plane phase front there arises after reflection a conically shaped phase front 9, which is likewise incident on the surface of the object at the Rayleigh angle $\theta_R$ and excites SAW 10 in it. The beams reflected by the surface of the object are received by the transducer 1 and converted into corresponding electrical signals, which are displayed on an oscilloscope (not shown). A micropositioning system (also not shown)

permits a raster-like relative displacement between the acoustic lens arrangement 1, 2, 3 and the object 5 to be investigated.

The transducer 1 consists of a plane ceramic disk, the thickness of which is designed for a resonant frequency of 1 MHz. The surface of transition to the immersion liquid 4 is provided with a $\lambda/4$ matching layer (not shown). The transducer is driven by a voltage pulse, which has a duration of approximately 0.2 microsecond and which generates a sinusoidally decreasing pressure pulse. The irradiated ultrasonic pulse has a length of approximately 5 microseconds and has a mean frequency of 1 MHz.

In order to generate a conical phase front of the acoustic wavefield, the cylindrical concave surface 7 should have a parabolic shape. Since this can only be produced with difficulty, experiments have also been carried out successfully with a circularly cylindrical mirror surface, as an approximation to this shape. The geometrical limitation of this simplified concave surface was selected in such a manner that, on acoustic irradiation of the reflector with a plane wavefront, the boundary rays exhibit a path difference relative to the central ray of no more than $\lambda/4$, where $\lambda$ is the wavelength of the ultrasonic beam in the immersion liquid 4.

Figure 2:
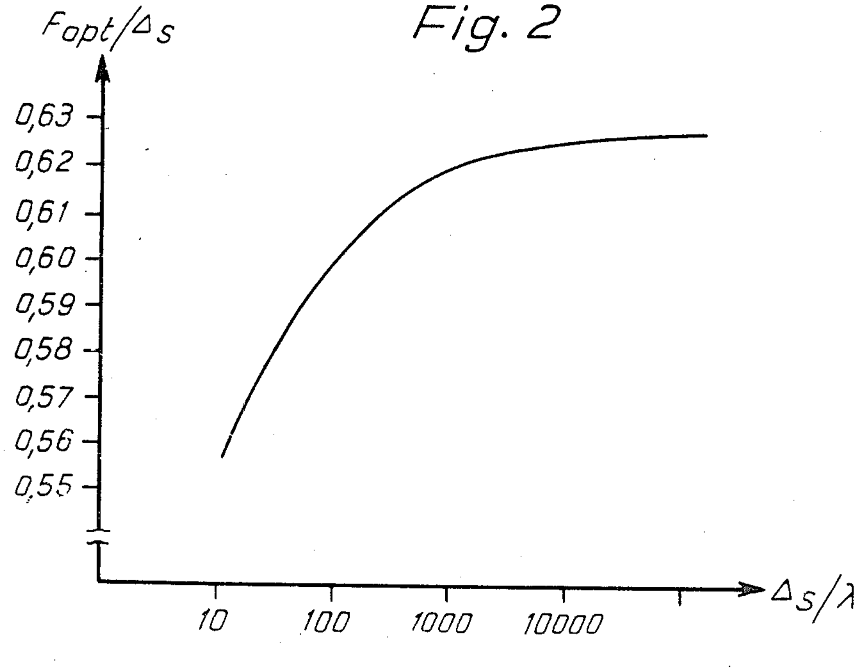
FIG. 2 shows a graphical representation for the determination of the optimal focal length of the acoustic lens arrangement.

For an optimal design of the acoustic lens arrangement, a specific focal length must be selected, which is dependent on the frequency of the ultrasonic wavefield employed and on the material to be investigated. The optimal focal length $f_{opt}$ can be read off from FIG. 2. In this figure, $f_{opt}$ is normalized in relation to the Schoch displacement $\Delta_s$, and is plotted as a function of $\Delta_s/\lambda$, where $\lambda$ is the acoustic wavelength in the immersion liquid. According to Brekovskikh (1980), the ratio $\Delta_s/\lambda$ is given by $$\frac{\Delta_s}{\lambda} = \frac{2}{\pi} \cdot p \cdot \left(\frac{r(r-s)}{s(s-1)}\right)^{\frac{1}{2}} \cdot \left[\frac{1 + 6s^2(1-q) - 2s(3-2q)}{(s-q)}\right]$$

where $$s = \left(\frac{V_s}{V_R}\right)^2, r = \left(\frac{V_s}{V}\right)^2, q = \left(\frac{V_s}{V_l}\right)^2$$

where V is the velocity of sound in the immersion liquid and where $V_s$, $V_l$ and $V_R$ represent the shear, the longitudinal and the Rayleigh velocities of sound in the solid body to be investigated.

$\Delta_s/\lambda$ can be calculated with reference to this formula, if the respectively applicable physical parameters are inserted. For aluminum, the value of $\Delta_s/\lambda$ is for example 21.3, for stainless steel 57.85, for molybdenum 90.3, and for aluminum oxide ($Al_2O_3$) 118.3. It can be shown that the dependence of $f_{opt}/\Delta_s$ on $\Delta_s/\lambda$ is rather loose, and that in general it is possible to select $f_{opt}=0.59\ \Delta_s$. At an ultrasonic frequency of 1.5 MHz, $f_{opt}$ then becomes for example 12.5 mm for aluminum objects. An ultrasonic frequency of 100 MHz gives $f_{opt}=1.05$ mm for aluminum oxide ($Al_2O_3$). If the parabolically cylindrical reflector is approximated by a cylindrical surface with circular curvature, then $f_{opt}$ is equal to one half of the radius. An $f_{opt}$ of 12.5 mm can be achieved with a cylinder of a diameter of 50 mm, and an $f_{opt}$ of 1.05 mm can be achieved by a cylinder of a diameter of 4.2 mm.

Once $f_{opt}$ has been determined, the maximum width $2x_m$ of the reflector, at which no significant cylindrical aberrations occur, can be calculated according to the following formula:

$$2x_m = \frac{4 f_{opt}}{\left(2 \cdot \frac{f_{opt}}{\Delta_s} \cdot \frac{\Delta_s}{\lambda}\right)^{\frac{1}{2}}}$$

With this value, the lens arrangement achieves maximum resolutions. It is 22.4 mm for aluminum at an ultrasonic frequency of 1.5 MHz, and 1.22 mm for $Al_2O_3$ at 100 MHz.

The aperture (f number) of the lens arrangement can be determined as follows with the application of the already determined values:

$$f\text{ number} = \frac{f_{opt}}{2x_m} = \frac{\left(2\frac{f_{opt}}{\Delta_s} \cdot \frac{\Delta_s}{\lambda}\right)^{\frac{1}{2}}}{4}$$

and gives 0.56 for aluminum and 0.86 for $Al_2O_3$.

The height H of the reflector should be equal to $f_{opt}$·cot $\theta_R$, if the base surface of the reflector almost touches the surface of the object to be investigated. The optimum height is 21.7 for aluminum at 1.5 MHz and 4 mm for $Al_2O_3$ at a 100 MHz.

All indicated absolute values change on selection of different ultrasonic frequencies, in inverse proportion to the frequency ratio.

A suitable mirror material is for example brass, which exhibits a high acoustic impedance in relation to the immersion liquid water. In one exemplary embodiment, the mirror had a height of 38 mm, a breadth of 37 mm and a cylinder radius of 50 mm. These dimensions differ from the limiting values which are optimum on the basis of theory for the investigation of aluminum, but only slightly. However, it has become evident that the losses attributable thereto in the signal power are negligible.

If aluminum is used as a test object, this results, at an ultrasonic frequency of 1 MHz, in a wavelength of the SAW of 2.85 mm, whereby the diameter of the diffraction-limited focus and the layer thickness of the surface of the object at which the SAW travel are also determined. Any inhomogeneities which are present within this layer thickness can be recognized because of the acoustic waves reflected back at them. Accordingly, a test plate having a thickness of 10 mm acts, as far as the SAW are concerned, in the manner of a quasi-infinitely thick object.

Figure 3:
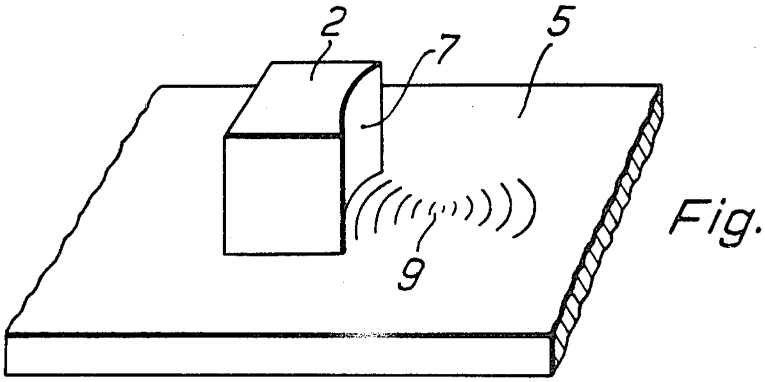
FIGS. 3 and 3*a* show the signal in the case of undisturbed surface wave propagation.
Figure 3A:
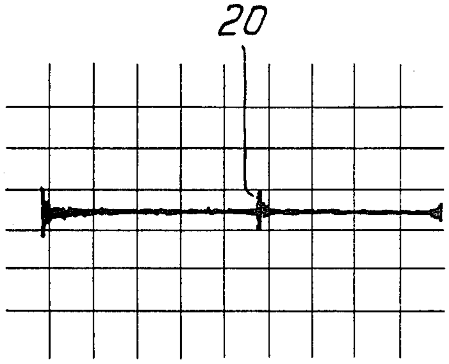
Figure 4:
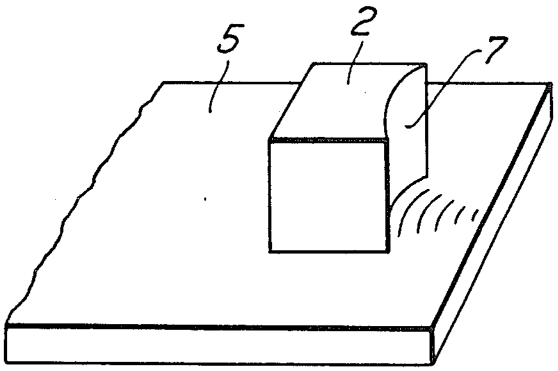
FIGS. 4, 4*a* and 4*b* show the signal in the case of a discontinuity in the SAW focus.
Figure 4A:
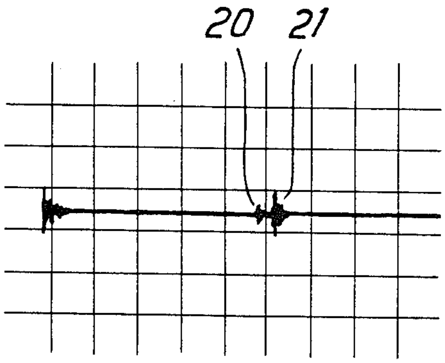
Figure 4B:
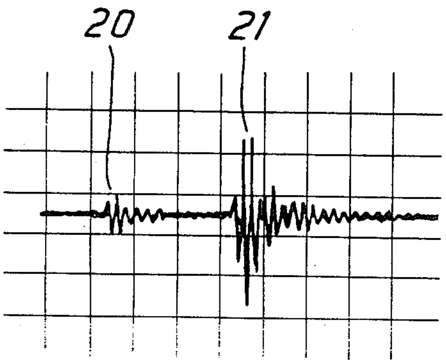

The acoustic lens arrangement is in the first instance to be disposed at the center of a sufficiently large test surface. This case is schematically represented in FIG. 3. The oscilloscope image of the measurement signal which is shown in FIG. 3*a*, shows only an echo pulse 20. This signal can be attributed to the already described fact that the acoustic wavefront generated by the acoustic transducer is not accurately plane and that on the reflector 2 there are also incident beam components, the angles of incidence of which differ to a greater or lesser extent from the Rayleigh angle $\theta_R$. These are reflected at the edge between the surface of the object and the cylindrical concave surface and generate the echo signal. By optimization of the geometry of the transducer and the reflector, as well as by the setting of an appropriate detection sensitivity, this signal can be minimized. If, as shown in FIG. 4, the acoustic lens arrangement is displaced to the edge of the test surface, in such a manner that the focus of the SAW is situated precisely at the edge, then a second significantly greater echo pulse 21 is observed in the oscilloscope. This is shown in FIG. 4*a*, and again, on an enlarged scale, in FIG. 4*b*.

The interval between the two echo pulses 20, 21 amounts to 17 microseconds. This corresponds to the transit time of the SAW for a distance of 50 mm, i.e., to twice the focal length. This gives rise to the derivation of a very simple process for the precise setting of the Rayleigh angle $\theta_R$ between the radiation direction of the plane acoustic wavefield emanating from the transducer and the longitudinal axis of the reflector. The reflector is to be disposed at an interval equal to its focal length from an edge of the object to be investigated, and the angle of inclination of the transducer is to be altered until such time as the amplitude of the echo pulse 21 adopts a maximum value.

By means of measurements of various test objects, it could be confirmed that with focused SAW having a wavelength of approximately 3 mm, periodically occurring defects having a spacing of approximately 2 mm could be separably detected. At the same wavelength, inhomogeneities which were situated approximately 2.5 mm below the surface of the object could also be clearly identified, whereby it is confirmed that the depth of penetration of the SAW corresponds to their wavelength.

The device for the setting of the angle of inclination between the transducer and the reflector serves principally for the optimization of the object-dependent Rayleigh angle $\theta_R$, for the almost loss-free conversion of the irradiated acoustic wavefield into SAW. It is however known that, in the case of specific layer structures, not only SAW but also other waves can be excited in the object, which waves are likewise dependent upon the angle of incidence of the ultrasonic rays at the liquid-/object interface. Such waves are, for example, known under the name of Love waves, Stonely waves and Sezewa waves. If the object to be investigated carries for example several layers, situated one above the other, of different materials, these waves can be selectively excited, if the angle of incidence in the liquid is set in an appropriate manner. The waves penetrating into the object are focused in a similar manner to the SAW. On this basis, it becomes possible to achieve a greater depth of penetration of the acoustic focus than in the case of the SAW.

Figure 5:
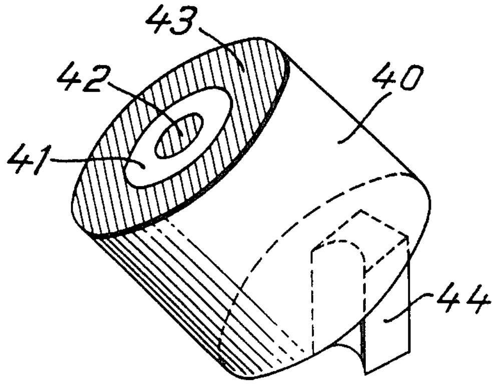
FIGS. 5, 6 and 7 show possible embodiments of the acoustic lens arrangement.

The device according to the invention has been described above for cases of application at relatively low ultrasonic frequencies. However, it may also be employed in acoustic microscopes, which utilize ultrasonic frequencies extending into the GHz range. An appropriate lens arrangement is represented in FIG. 5. A rod 40 of a material with low acoustic losses, such as for example sapphire, is provided with parallel, plane polished end surfaces. On one side there is fitted an acoustic transducer 41 (ZnO), which is disposed between two gold electrodes 42, 43. The other side is provided with a $\lambda$/4-antireflex coating of glass or plastic material with appropriate acoustic impedance, in order to achieve good matching for the passage of the ultrasonic rays into the immersion liquid (not shown). The cylindrical, preferably parabolically shaped reflector 44 is affixed to this side of the rod 40 in such a manner that a specific Rayleigh angle $\theta_R$ to its longitudinal axis is created. It consists, for example, of aluminum or another solid material of high acoustic impedance. The geometrical dimensions (height and width) and the focal length must be adapted to the ultrasonic frequency provided. They are reduced in relation to the quantities mentioned for 1 MHz, in almost linear proportion to the increase in the ultrasonic frequency. For this reason, it will be expedient, for the investigation of different materials, to provide various fixed lens arrangements with a reflector inclined in accordance with the required Rayleigh angle $\theta_R$. However, in this case also, it is in principle possible to make the angle of inclination adjustable, which permits an individual adaption to the object to be investigated.

Figure 6:
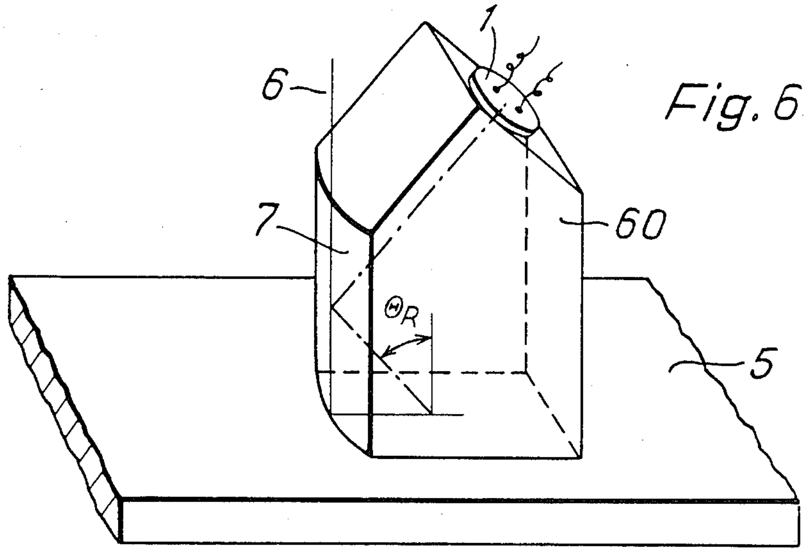

FIG. 6 shows a very compact and mechanically very stable embodiment of the acoustic lens arrangement. The transducer 1 and the cylindrical surface 7, which is concave in relation to the transducer, are formed at external surfaces of a solid body 60 suitable for the acoustic transmission. In order to provide improved coupling of the focused acoustic beam to the surface of the object, a thin layer of immersion liquid can also be inserted between the exit surface of the lens arrangement and the surface of the object.

Figure 7:
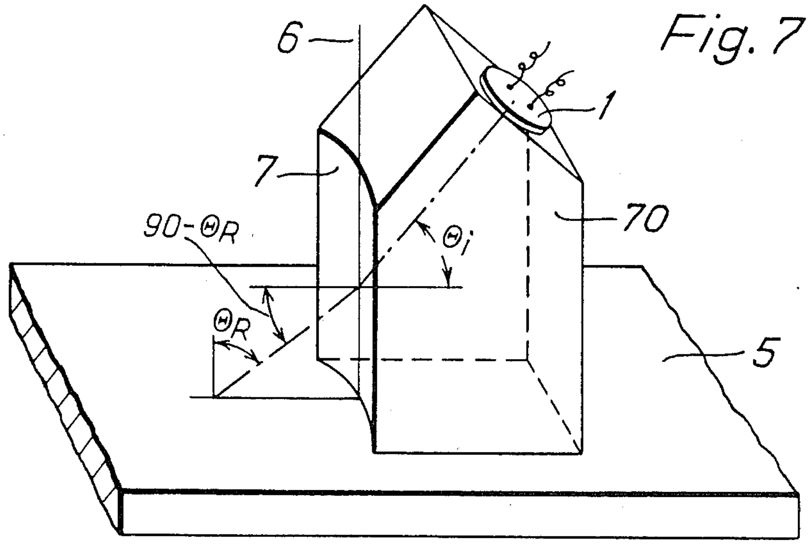

A further exemplary embodiment is shown in FIg. 7. In this arrangement, the acoustic focusing is generated not by a reflection at the cylindrical surface standing perpendicular to the surface of the object but in this case by refraction at such a surface. The acoustic transmission from the transducer 1 takes place through a solid body 70 to the cylindrical concave surface 7, which in this case is arched towards the transducer, and its longitudinal axis 6 stands perpendicular to the surface of the object 5. The direction of the normal to the plane acoustic wavefield emanating from the transducer is inclined relative to the surface of the object at an angle $\theta_i$. The space between the concave surface 7 and the surface of the object 5 is filled by an immersion liquid (not shown).

If the difference between the velocities of propagation for the acoustic beams in the solid body 70 and the immersion liquid is large enough, then the concave surface 7 acts in a horizontal direction in the manner of a cylindrical lens. On the other hand, in the vertical direction Snell's law of refraction must be followd:

$$\frac{\sin \theta_i}{\sin (90 - \theta_R)} = \frac{V_{Solid\ body}}{V_{Immersion}}$$

where $V_{solid\ body}$, $V_{immersion}$ signify the phase velocities of the acoustic waves in the two transmission media. Following refraction, there again arises a conical wave front as in the case of the above-described reflection lens arrangements.

The inclination of the transducer plane is to be selected in such a manner that, taking into account the refraction at the concave surface 7, the acoustic waves are incident on the surface of the object at the critical angle $\theta_R$. In these circumstances, SAW are again generated in the surface of the object, whcih are focused at a point. It should also be mentioned that, in the course of acoustic propagation in the solid body 70, both longitudinal waves and also shear waves can be excited. $V_{solid\ body}$ is then to be understood as referring to the phase velocity for the type of wave utilized in each instance. In order to avoid transmission losses, the concave surface 7 is to be provided with a suitable anti-reflex coating.

The maximum magnitude of the angle $(90-\theta_R)$ is determined by the choice of the solid body 70 and of the immersion liquid. As a result of this fact, the selection of the solid transmission medium is restricted in dependence upon the properties of the material of the object to be investigated. It is in principle the case that the acoustic propagation velocity in the solid body 70 must be lower than in the surface of the object 5.

In the above-described exemplary embodiments, the acoustic transducer is usually employed in a pulse echo procedure alternately as an emitter and as a receiver. In the case of continuous acoustic generation, the acoustic waves returning from the object will interfere with those transmitted.

Figure 8:
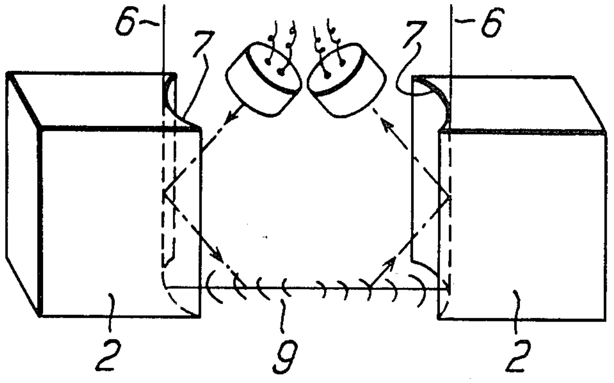
FIGS. 8, 9 and 10 show arrangements with separate emitting and receiving systems.

FIG. 8 shows an embodiment with two lens arrangements, which are in a mutually confocal configuration and of which one serves as emitter and the other as receiver for the acoustic waves, as is indicated by the directions of the arrows. Both arrangements are disposed on the same axis of SAW propagation. Such a construction can, of course, operate both with continuous and with pulsed acoustic wave generation. In the pulse echo mode, two signals may be obtained, which are associated with the acoustic wave components backscattered in a direction towards the emitter and forwardscattered in a direction towards the receiver.

Figure 9:
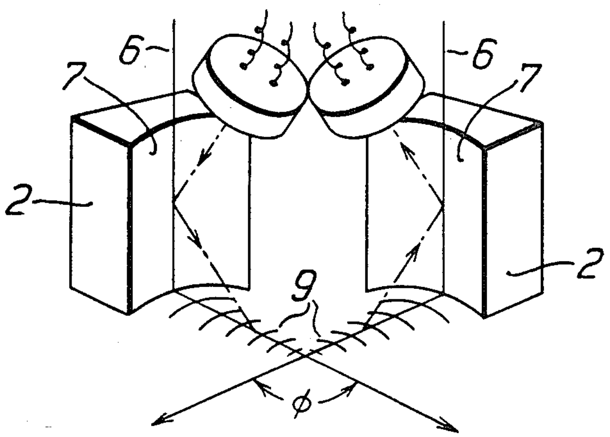

The arrangement which is represented in FIG. 9 and which consists of two confocal lens arrangements is selected in such a manner that the directions of SAW propagation form an angle $\theta$ with one another. This angle can be made adjustable. This arrangement is also suitable for continuous and for pulsed acoustic generation. With this arrangement, anisotropies in SAW reflection may in particular be determined.

Figure 10:
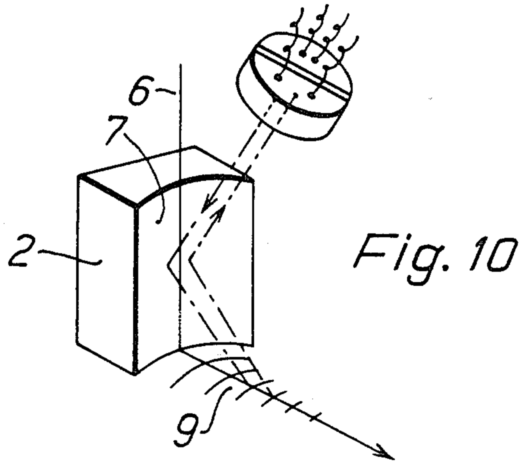

The embodiment represented in FIG. 10 operates with only one reflector and a two-part transducer, one part of which can be employed as emitter and the other part as receiver, both in the continuous and in the pulsed mode. The imaging properties of the reflector assure an adequate direction selection between the emitted and the received acoustic beam, so that the two beams do not interfere or only interfere to a very slight extent with one another, this being the case regardless of the orientation of the line of separation between the transducers.

What is claimed is:

1. An acoustic lens arrangement comprising:

(a) a transducer means for generation and reception of acoustic waves, (b) means for focusing said acoustic waves in a region of an object to be examined;

(c) at least one medium disposed between said transducer means, said focusing means and said object region for low-loss transmission of said acoustic waves;

(d) said focusing means includes a cylindrical surface having a longitudinal axis positioned normal to said object region; and (e) said transducer means positioned for generating said acoustic waves at an angle $\theta_R$ with respect to said longitudinal axis, said angle equal to the angle between a normal to a surface of said object region and acoustic waves incident on said surface of said object region and defined by $$\theta_R = \sin^{-1}\frac{V_I}{V_R}$$

where $V_I$=phase velocity of the acoustic wave in said at least one transmission medium disposed between said focusing means and said object region and $V_R$=phase velocity of the acoustic wave in the object region.

2. The acoustic lens arrangement as recited in claim 1, wherein said at least one medium is a liquid.

3. The acoustic lens arrangement as recited in claim 1, wherein said at least one medium is a solid.

4. The acoustic lens arrangement as recited in claim 1, wherein said at least one medium is a solid medium disposed between said transducer means and said focusing means and said arrangement further includes a liquid medium for the low-loss transmission of said acoustic waves, said liquid medium disposed between said focusing means and said object region.

5. The acoustic lens arrangement as recited in claim 1, wherein said at least one medium is a gas.

6. The acoustic lens arrangement as recited in claim 1, further including means for adjusting the position of said transducer means for varying the angle of said acoustic waves incident on said focusing means.

7. The acoustic lens arrangement as recited in claim 1, wherein said transducer means comprises a divided transducer, a first part of which operates as an acoustic wave generator and a second part of which operates as an acoustic wave receiver.

8. The acoustic lens arrangement as recited in claim 1, wherein the cylindrical surface is positioned opposed to said transducer means and is arched and employed in transmission as a refracting surface.

9. The acoustic lens arrangement as recited in claim 1, wherein said cylindrical surface of said focusing means has a parabolic cross section.

10. the acoustic lens arrangement as recited in claim 9, wherein said cylindrical surface is curved in a concave manner with respect to said acoustic waves generated from said transducer means, and said acoustic waves are reflected from said cylindrical surface toward said object region.

11. The acoustic lens arrangement as recited in claim 10, wherein the acoustic impendance of said curved surface is high in comparison with that of said transmission medium.

12. The acoustic lens arrangement as recited in claim 10, further including means for adjusting the position of said transducer means for varying the angle of said acoustic waves incident on said focusing means.

13. The acoustic lens arrangement as recited in claim 1, wherein said cylindrical surface is curved in a concave manner with respect to said acoustic waves generated from said transducer means, and said acoustic waves are reflected from said cylindrical surface toward said object region.

14. The acoustic lens arrangement as recited in claim 13, wherein the acoustic impedance of said curved surface is high in comparison with that of said transmission medium.

15. The acoustic lens arrangement as recited in claim 13, further including means for adjusting the position of said transducer means for varying the angel of said acoustic waves incident on said focusing means.

16. The acoustic lens arrangement as recited in claim 1, wherein said transducer means comprises a first transducer for generating said acoustic waves and a second transducer for receiving acoustic waves from said object region.

17. The acoustic lens arrangement as recited in claim 16, wherein said focusing means comprises a first focusing device associated with said first transducer for directing acoustic waves from said first transducer toward said object region and a second focusing device, associated with said second transducer for directing acoustic waves from said object region toward said second transducer.

18. The acoustic lens arrangement as recited in claim 17, wherein said first transducer and first focusing device are positioned relative to said second transducer and second focusing device such that the plane containing a central acoustic ray of the acoustic waves from said first transducer and first focusing device coincides with the plane containing a central acoustic ray of the acoustic waves received by said second focusing device and second transducer.

19. The acoustic lens arrangement as recited in claim 17, wherein said first transducer and first focusing device are positioned relative to said second transducer and second focusing device such that the plane containing a central acoustic ray of the acoustic waves from said first transducer and first focusing device forms an angle $\theta$.

20. The acoustic lens arrangement as recited in claim 19, wherein said angle $\theta$ is adjustable.

21. The acoustic lens arrangement as recited in claim 1, wherein said cylindrical surface of said focusing means has a circular arc cross section.

* * * * *